INVENTOR
ERIK W. ANTHON

BY Albert H. Graddis
ATTORNEY

INVENTOR
ERIK W. ANTHON

BY *Albert H. Graddis*

ATTORNEY

Jan. 13, 1970    E. W. ANTHON    3,489,524
AUTOMATIC TITRATOR
Filed Dec. 2, 1965    3 Sheets-Sheet 3
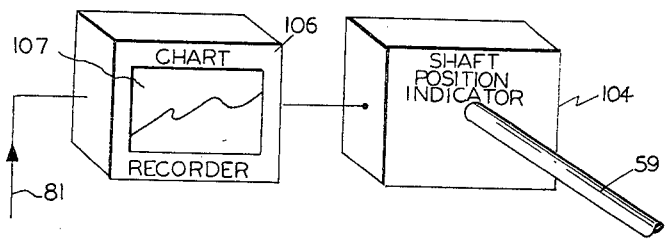
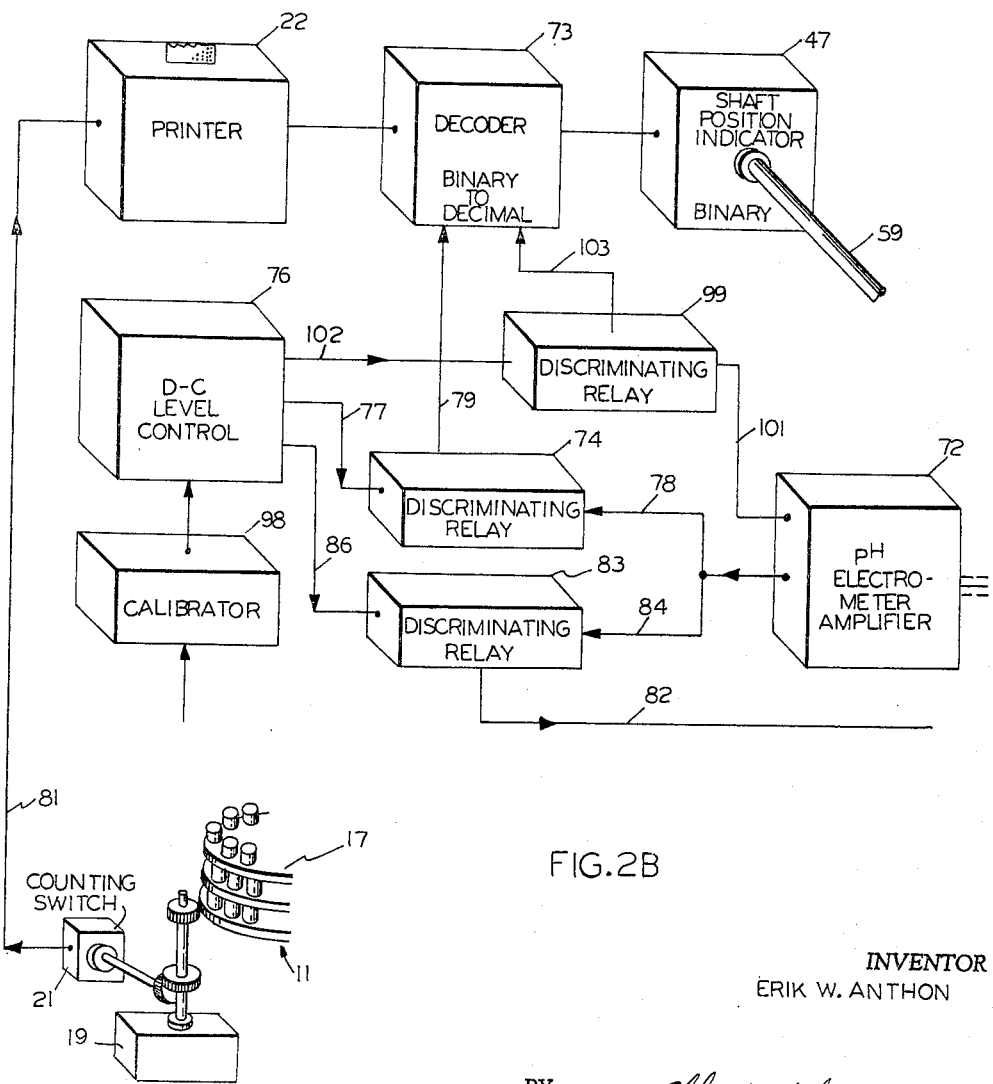
INVENTOR
ERIK W. ANTHON
BY *Albert H. Graddis*
ATTORNEY United States Patent Office 3,489,524
Patented Jan. 13, 1970

3,489,524
AUTOMATIC TITRATOR
Erik W. Anthon, Kensington, Calif., assignor, by mesne assignments, to American Optical Corporation, Southbridge, Mass., a corporation of Delaware
Continuation-in-part of application Ser. No. 138,527, Sept. 15, 1961. This application Dec. 2, 1965, Ser. No. 528,015
Int. Cl. G01n *31/16*
U.S. Cl. 23—253         1 Claim

ABSTRACT OF THE DISCLOSURE

Titration apparatus having a series of vessels arranged for successive presentation in continuous repetitive cycles at a plurality of fixed transfer stations at which stations a sequence of operations are performed (a) to receive a measured amount of sample from another container and to receive a reagent at the first station, (b) to receive another reagent and to record pH, and to wash the electrodes at the second station, and (c) to remove the treated sample and wash the vessel at the third station to prepare the vessel for repetition of the treatment of another sample in said vessel at said stations.

---

Figure 1:
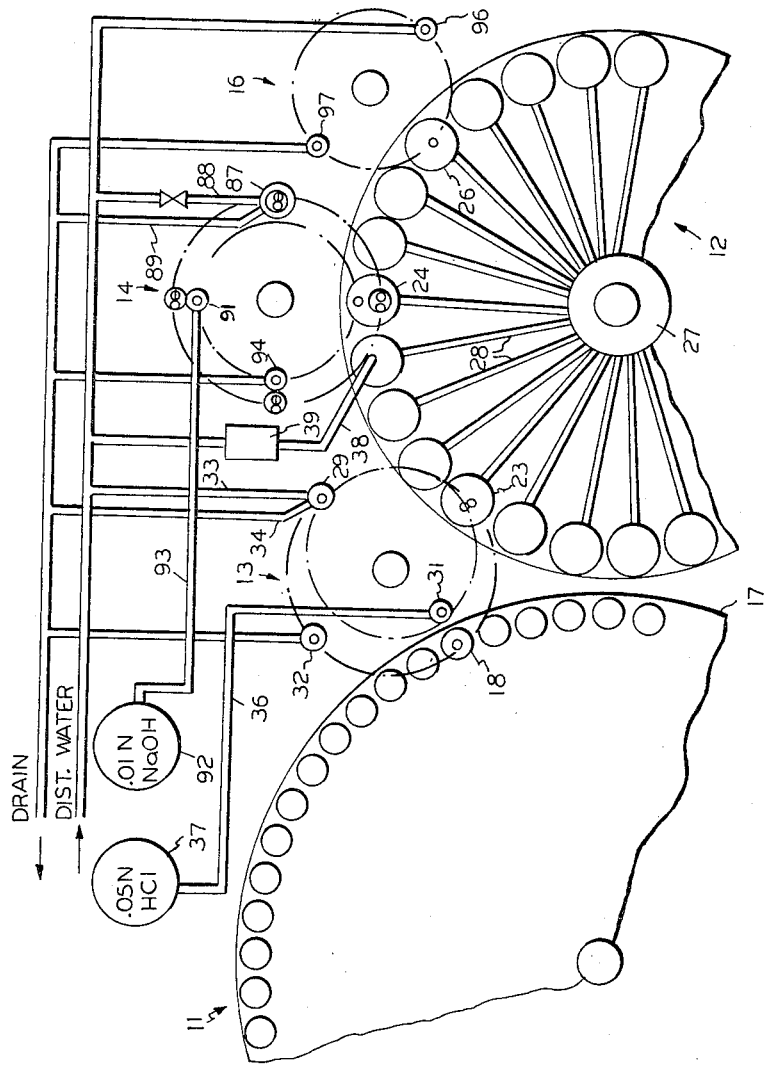

This application for U.S. Letters Patent is a continuation-in-part application of U.S. patent application Ser. No. 138,527, filed Sept. 15, 1961, now abandoned.

The present invention relates to an improved apparatus for conducting chemical titration analysis and more particularly, to an automatic titration apparatus which sequentially processes a plurality of liquid samples in series while individually recording the process results derived from each sample.

In analyzing a great number of liquid chemical samples of similar character by an established routine, manual analysis of each sample by an operator invites the likelihood and frequency of both variations and errors. Inasmuch as performance of similar operations lends itself to automation, the use of automatic analyzing apparatus can result in material savings in the time of the operator, and has the further advantage of increasing the accuracy of the analyses by reducing the chance of error.

The apparatus of the present invention is particularly suited for use in such an automated system. In general, it may be programmed to perform a variety of different types of volumetric analyses including acidimetry and oxidation-reduction types. Thus, broadly speaking, the end point may be measured by a pH meter or a color sensitive receptor.

The present apparatus is also capable of adding reagents so as to carry out a fixed predetermined procedure including other steps in addition to titrating. Alternatively, other related procedures may be carried out by hand or in other apparatus in combination with the operation of the titrator of this invention.

Thus, the present apparatus may be used in a compound system together with other automatic components which can be combined in different ways with themselves and with many compatible items from other sources. Each component performs a specific action or group of related actions.

When the particular analysis desired is completed and it becomes expedient to switch the apparatus over to a different type of analysis, the apparatus may be programmed to perform the newly desired analytical operation. This programming may require use of different reagents, different measured endpoints and addition, reduction or modification of certain of the parts of the apparatus.

Some of the principal problems solved by the present apparatus are those of consistently and accurately adding and handling measured quantities of samples and reagents. In order to provide excellent accuracy, it is important that the apparatus be self-cleaning; that is, it should wash itself out and dry itself after the handling of one sample is completed and before attempting to handle the next sample.

Flexibility as to the types or patterns of operations carried out is desirable as is flexibility in the timing or duration of the different operations. The apparatus should also be compatible with other components of the system.

Another problem which is solved by the present apparatus is that of rapidly analyzing a large number of samples and accurately recording the results. In routine operations, the cost per operation is considerably reduced by increasing the speed of each operation. Thus it is important to treat the samples with a plurality of operations conducted simultaneously, and fit them together so that the idle time for any single component is minimized.

The apparatus is particularly valuable for medical analysis or industrial control analysis where an extremely large number of similar analyses must be carried out as a routine matter. In such cases, the present apparatus may be used to advantage for literally thousands of determinations without any substantial change in programming.

It is a primary object of this invention to provide an automatic titrator which is capable of titrating a plurality of samples both accurately and rapidly, and recording the results for each sample.

Another object of the present invention is to provide an automatic titrator of the character described which will maintain each sample in the same sequential relationship with respect to the other samples during the entire handling period so as to make each individual sample readily identifiable at all times.

A further object of the present invention is to provide an automatic titrator of the character described which will retain a minimum amount of sample and other materials on its elements after the sample has been analyzed and which will automatically wash out all passages, chambers and other contaminated surfaces prior to handling the next sample.

Still another object of the present invention is to provide an automatic titrator of the character described which may be programmed to provide a variety of types of analyses and analytical operations, the apparatus being flexible as to the sequence in which the steps are performed and the timing and duration of each operation.

Yet another object of the invention is to provide an automatic titrator which is particularly suitable for analyzing materials capable of being analyzed by their acidic or basic content or the ability to react quantitatively with an acid or base so as to be determined by measurement of excess acid or base through titration of such excess.

Further objects and advantages of my invention will appear as the specification proceeds, and the new and useful features of my automatic titrator will be fully defined in the claims hereto attached.

In its broad aspect, the invention provides an automatic titrator which comprises a container for holding a sample, means for adding a measured quantity of standard solution to the sample in the container, and means for measuring the end point of the sample during the addition of standard solution together with other means for handling the sample while the analysis is carried out.

Figure 2A:
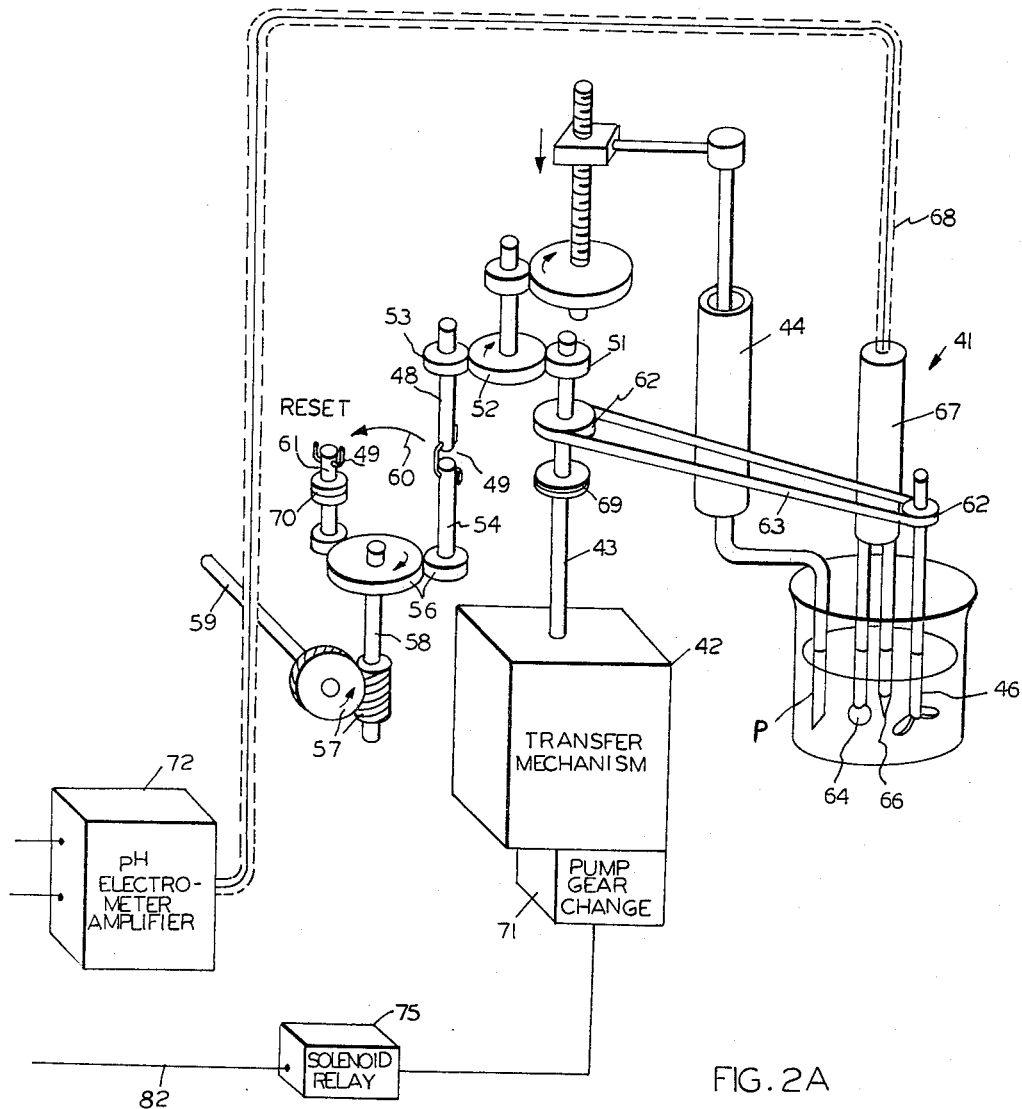

The preferred forms of my invention are illustrated in the accompanying drawings, forming part of this application, in which:

FIGURE 1 is a schematic plan view of the apparatus used to hold and advance the sample through the various parts of the system;

FIGURE 2, a schematic illustration of the various components in the titration, measurements and recording of the same with FIGURE 2A illustrating the mechanical components and FIGURE 2B illustrating the electronic and recording components;

FIGURE 3, a schematic showing of an optional recording system.

While I have shown only the preferred form of my invention, it should be understood that various changes or modifications may be made within the scope of the claim hereto attached without departing from the spirit of the invention.

The form of titrator shown in the drawings illustrates an acid-base titrator which is programmed to analyze for bicarbonate or the like. Such analysis is used as a part of the analysis of blood and is carried out on blood serum with the solid components of the blood absent. However, it will be appreciated that this form of titrator could be used to analyze for the acid content in vinegar or any other acid-base type of analysis.

Briefly speaking, the titrator shown is programmed to perform all of the following steps automatically: it transfers the sample from a storage element to a process test tube or container; it adds a mixture of a fixed amount of standard hydrochloric acid and an anti-foam agent to the sample in the process container; it aerates the resulting mixture with air which is free of carbon dioxide to remove the carbon dioxide formed by the reaction of the hydrochloric acid and the bicarbonate in the sample, thereby leaving an excess of acid positively determined by the amount of bicarbonate in the sample; then it adds distilled water to adjust the volume of the sample and titrates with standard sodium hydroxide solution to and beyond the desired end points; at least one and frequently a plurality of end points are determined by a pH meter and recorded in terms of both the pH of the sample and the amount of standard sodium hydroxide used; it then discards the sample, washes the process container and electrodes, recalibrates the pH meter, refills the titrating pump and resets the metering device on the titrating pump to zero.

Referring to the drawings in detail, it will be seen that the automatic titrator of the present invention contains a storage turntable 11 for holding samples and advancing them from one station to another and a process turntable 12 which carries the samples through the titration steps. In addition, there is a first transfer station 13, a second transfer station 14 and a third transfer station 16 where various operations are done on the sample.

Storage turntable 11 comprises a frame 17 which holds 100 test tubes, each 15 millimeters in diameter. For example, there is a test tube 18 in position to have its sample removed at the first transfer station 13. The turntable is driven by a motor 19 which advances the samples in synchronous motion with respect to the other motions of the apparatus. The motor may be programmed to drive clockwise or counterclockwise and it advances the turntable one step when it receives a starting impulse. This impulse is received after all steps at a given station are completed. On each movement, counting switch 21 is activated to transmit the proper identification of the sample to the printer 22. The turntable also has a vertical adjustment to assist in co-operation with transfer station 13.

The special process turntable 21 is similar in construction to storage turntable 11 except that it has 24 test tubes instead of 100. These include test tube 23 shown at the first transfer station 13, test tube 24 shown at the second transfer station 14, test tube 26 shown at the third transfer station 16 and others as shown in FIGURE 1 between stations. As indicated above, air which is substantially free of carbon dioxide is blown through the test tubes from air manifold 27 and air tubes 28. Glass frits are provided in the bottom of the test tubes to distribute the air as it passes through the sample. In this way, carbon dioxide is removed from the sample and agitation is also provided.

Each of the transfer stations 13, 14 and 16 contains a transfer mechanism comprising a vertical spindle, holding elements on the spindle and driving means for providing vertical and rotary motion. The construction of each transfer mechanism and associated equipment is disclosed at length and claimed in my copending United States patent application Ser. No. 61,206 filed Oct. 7, 1960, and now U.S. Patent No. 3,178,266.

In general, any driving means capable of driving a shaft in controlled rotation and synchronous vertical motion may be used to drive the holding elements, but the accessories used vary at the different transfer stations according to the function required at the station. In other words, different parts are used such as electrodes, pumps and probes for removing solution and for adding solution. When it is desired to add measured amounts of solution such as is done when reagents are added and titration is effected, special pumps are used as will be explained more fully below. All motion of the holding elements and pump strokes are controlled by a programming unit (not shown).

Thus, at the first transfer station 13, the transfer mechanism has a holding element or index head which carries two pumps. Each pump contains a probe P and operates somewhat like a hypodermic syringe, that is, it contains a cylinder that draws in liquid on a stroke of a reciprocating piston and discharges the liquid on the reverse stroke. In this way, measured amounts of liquid are taken up from a well or the like and delivered where wanted. The preferred pump units are disclosed and claimed in my copending United States patent application Ser. No. 113,193 filed May 29, 1961 entitled Pump Construction and now U.S. Patent No. 3,120,789. In this disclosure, two drives are used, one which raises, lowers and advances the index head, and the other which drives the pump forward and reverse, according to the programming.

Referring again to FIGURE 1, it is seen that test tube 18 in the storage turntable and test tube 23 of the process turntable are in position to give up and receive sample. The first transfer station also has well 29, well 31 and drain 32. Well 29 supplies distilled water for rinsing and thus cleaning the probe that transfers sample. Water is supplied for the well through pipe 33 and the well is flushed out and kept at a constant level through excess supply which goes out overflow 34. Well 31 contains a constant level of 0.05 normal HCl solution which is supplied through pipe 36 from the reservoir 37. Constant level may be achieved by any known means.

After receiving the sample and standard acid, the test tube advances to a station where it next receives a charge of distilled water from pipe 38 which is in communication to the water supply through solenoid valve 39. By this mechanism, 10 milliliters of distilled water is added. At the same time, it is seen that air is being bubbled through pipes 28 to remove carbon dioxide.

Thus it is seen that when the sample arrives at the position of test tube 24 at the second transfer station 14, it is ready for titration. The titration head 41 is shown schematically in FIGURE 2A together with its accessory parts. Transfer mechanism 42 is similar to that described above at the first transfer station 13; that is, it raises and lowers the titration head and advances it through four positions; each 90 degrees of rotation from the preceding station. This is accomplished by a shaft (not shown). A separate drive rotates spindle 43 according to the signals received from the programmer, and this spindle then drives and positions the pump 44, stirrer 46, and drives a metering device or shaft position digitizer 47 to measure the amount of solution delivered from pump 44 when in titrating position, As shown in FIGURE 2A, the metering device is in driving position, and driving is effected from the spindle 43 to shaft 48 and disconnectable drive 49, through gears 51, 52 and 53. When the titration head is in titrating position, shaft 48 is in engagement with shaft 54 through drive 49. Shaft 54 then drives the meter 47 through gear pairs 56 and 57 and shafts 58 and 59. When the titration head is not in position for titrating, the shaft 48 is lifted out of engagement with shaft 54 at drive 49. At the position of the titration head where the pump is refilled, spindle 43 is turned in reverse and the shaft 48 is moved as shown by arrow 60 into engagement with shaft 61. Shaft 61 of the reset mechanism then drives the meter in reverse back to zero as the pump is refilled.

While in titration position, it is seen that stirrer 46 rotates by virtue of the drive through gears 62 and belt 63. Glass electrode 64 and reference electrode 66 are also dipped into the sample so as to provide a potential between them determined by the hydrogen ion concentration of the solution. These electrodes are mounted in a swivel holder 67 to prevent twisting of cable 68 as the titration head rotates.

In order to protect the pump from being driven beyond its limit, a slip clutch 69 is provided on drive shaft 43. Similarly, slip clutch 70 is provided to allow slippage after the meter is reset to the zero point in the event it is necessary.

In a preferred form of the invention, means are provided to titrate rapidly until a reference pH is reached and then to titrate more slowly until the end point is reached. This arrangement allows both more rapid operation of the apparatus and increased accuracy. These means include a transmission 71 which is activated by solenoid 75. Thus rapid titration is done as titration begins, and at a desired titration point, which may be about pH 7 or, if desired, as low as 4 or 3, the solenoid shifts the transmission and titration proceeds at a slower rate. The solenoid receives its signal from a relay in the read-out system as will be explained further below.

As indicated above, a potential dependent on the hydrogen ion concentration or pH in the sample is obtained at electrodes 64 and 66. This is a high impedance voltage, which is converted into a low impedance output signal in the pH electrometer amplifier 72 (shown in both FIGURE 2A and FIGURE 2B).

The signal represented as a low impedance voltage from amplifier 72 is then used to activate the printer 22 which instantaneously prints the amount of standard solution delivered from the pump 44. As indicated above, this value is transmitted to the position digitizer 47. From there it is sent through decoder 73 to printer 22, and the value delivered from the pump is thus always available to be printed in printer 22 on activation of the printer. Alternatively, the shaft 59 could drive the printer directly with a different design, but I prefer to use the standard components shown which are available commercially.

Activation of the printer is obtained by a balanced condition in discriminating relay 74 according to the signal received from D.C. level control 76 through line 77 and amplifier 72 through line 78. This impulse is adjusted to match a desired pH potential at electrodes 64 and 66 according to the pH desired to be read on the printer. Thus when the voltage in line 78 from the amplifier 72, as determined by the pH of the sample, reaches the value of the preset voltage in line 77, discriminating relay 74 sends a signal through line 79 through decoder 73 to cause the printer 22 to print the titration value. At the same time, the printer 22 prints an identifying number to identify the sample. The signal for this number is received from the counting switch 21 through line 81.

The print-out is sufficiently instantaneous so that no measurable error results from the fact that the pump continues to deliver at a fixed rate. As indicated above, the pump is slowed down during the critical range of titration in a preferred form of the invention by solenoid relay 75. The solenoid is activated by a signal through line 82 from discriminating relay 83 on a balance of signals from the amplifier 72 through line 84 and D.C. level controller 76 through line 86. The motion of the relay may be adjusted by the voltage in line 86 so as to trip at a given set pH. It may also be set to trip back when the critical range of titration is passed through such as say pH 8 or, if desired, 10 or 11. In the latter case, activation may be by sufficient overvoltage on one side of the relay 83 or any other operable means.

As indicated above, the pump continues to deliver standard NaOH until the end of its cycle, and then the titration head moves on to the station at the next quadrant. Referring again to FIGURE 1, it is seen that after the titration is conducted in test tube 24, the head moves to position the electrodes in water well 87 where they are cleaned. Fresh water is continuously supplied through pipe 88 and the water level is maintained by overflow through pipe 89.

After the electrodes are rinsed, the titration head advances to the next station where the pump probe is immersed in well 91 and refilled with standard NaOH solution. As mentioned above, the meter is reset to zero at the same time. The NaOH is supplied from reservoir 92 through tube 93, and a constant level is maintained in well 91 by a mechanism similar to that used to maintain constant level in the acid well 31 as explained above.

After the pump is filled, the titration head advances to the next station where the forward stroke of the pump is begun to eliminate backlash and insure accuracy in the metering of solution delivered to the sample. The solution thus emitted is carried off through drain 94. The titration head is then advanced to titrating position and the titration carried out as explained above.

After titration is completed on the sample, it is advanced on around the turntable 12 and when it reaches the position indicated by test tube 26 at the third transfer station 16, the sample is removed and the sample tube cleaned. This operation is carried out by one or more probes carried on an index head similar to that used in the first transfer station 13. In this way, rinse water is picked up from well 96 and both sample and used rinse water are discarded through drain 97. A plurality of rinses may be accomplished by a plurality of probes and/or a plurality of circles of movement of the index head for each sample.

In order to compensate for drift of the signal from the electrodes and amplifier system, a calibrator 98 is operatively connected to the D.C. level control 76. A slow moving, non-coasting motor in the calibrator varies the D.C. level through a cam operated potentiometer, and the motor is stopped when the D.C. level matches the output signal from the electrometer amplifier at a calibrated input signal.

The range of variation is somewhat larger than the expected drift of the system. However, an alarm is actuated in the event that the calibrator fails to calibrate because of excessive drift of the electrometer.

As indicated above, the various operations are controlled by a programmer and can be varied to fit different situations and provide flexibility to the system. Thus, the programmer controls the operation of the transfer mechanism and the turntables. It consists of a system of control relays and a chain with rollers that operate microswitches.

The chain, driven by a synchronous motor, operates the switches with intervals of four and one-half seconds except for the titration pump which generally operates for about thirty seconds. The switches then initiate pump strokes, index the motion heads, index the motion of turntables, and may give signals to read-out devices if desired. The number of operations per cycle can be changed by changing the length of the chain. In addition, alternate programming of the cycle is possible for use when blank and active readings are made on each sample.

The programming unit is readily expanded as additional equipment is added to the system. Four microswitches and four relays are required for each turntable and for the read-out signal.

In the description given above, one end point is shown on the printer. However, in some cases it is desirable to measure a plurality of end points, and various ways of accomplishing this result may be included in the system.

For example, a second titration value (or pH reading) may be achieved by adding a second discriminating relay 99 which is in balance with the potential of the output of amplifier 72 when a different pH value is reached. This balance is obtained when the potential of line 101 is equal to that of reference potential in line 102. When the balance is reached, a signal is sent through line 103 back to the printer. In this way, two titration values may be recorded for the same sample. This indicates the sharpness of the titration through the critical value. In other words, printout for pH 7.2 and for pH 7.8 may be made. If the readings are close together a sharp end point is indicated. Other readout systems may be used, if desired, such as a system where the desired end point is set by the titration required to reach a preliminary value on one discriminating relay. Then, from the amount of standard NaOH used to reach this preliminary pH value, another D.C. level is fed into another discriminating relay to actuate the printer.

A particularly valuable system which clearly shows the nature of the titration curve is the read-out system shown in FIGURE 3. In that system, the amount of standard solution delivered is shown on a graph together with the pH value corresponding thereto; one reading being represented as the ordinate and the other as the abscissa.

Thus, the rod 59 that meters the titrating pump rotates the mechanism in the shaft position indicator 104 which drives a roller in the chart recorder 106. Alternatively, a direct drive could be used. By such a system, movement of the chart or graph 107 against a stylus (not shown) determines the ordinate on the graph. Then, on refilling the pump, the reset mechanism may be geared to move the chart on to a new position. Markings may be made on the chart to show the beginning position of the chart and the figures printed thereon after marking the chart.

Each chart is also marked to show the sample measured from the counting switch 21 through line 81 as explained above for the form first described. In this way, the graph is identified and the ordinate is determined.

In order to impress the proper position for the abscissa to show pH on the chart, a motor (not shown) drives the stylus horizontally to a position corresponding to the pH. This is accomplished by a motor which drives forward or reverse on an overbalance of a potential at either side and which is stationary when balance of potential is achieved. One side of the motor is connected to a D.C. level control that varies according to the position of the motor and corresponds to the pH value on the chart for the given stylus position. The other terminal of the motor is connected to line 101 or line 78 of the amplifier 72. A stop may be provided so that the motor begins at a reference pH such as say 7 and ends at another pH of say 8 or any other desired limits.

In operation of the motor, if the beginning point is at pH 7, the stylus remains at 7 until the signal from the amplifier gives a voltage level above 7. This increase drives the motor until the D.C. level from the other terminal matches it and the motor tends to be at this balanced position. Since this D.C. level is calibrated on the chart, the stylus tends to fix on such measured pH value as determined by the signal from the amplifier. In this way, a pH curve is obtained through the critical range. This curve is not useful to show the sharpness of the end point, but it also indicates the true end point and gives other valuable information.

From the foregoing description, it is seen that my automatic titrator may be programmed to handle a variety of different titrations, and that accurate, rapidly obtained valuable data is recorded in a permanent record.

It will be apparent from the foregoing that various modifications may be made in construction and operation of the present invention without departing from the scope thereof defined by the appended claim.

What is claimed is:

1. An automatic titrator comprising an orbital holder constructed to receive and move a plurality of samples from one station to another, a plurality of sample containers for holding the samples during titration thereof, an orbital turntable for holding the containers and advancing them from one station to another, a first transfer station for transferring samples from the holder and a reagent to the containers held on the turntable, a second transfer station where a standard solution is added to each of the sample containers and the pH of each of the samples is measured during the addition of the standard solution, electrodes at the second transfer station constructed to provide a high impedance signal responsive to the pH of the sample at said station, means for moving electrodes into and out of each of the sample containers at the second transfer station, means for cleaning the electrodes after movement into one container and prior to movement into another container, an amplifier to provide a low impedance signal in response to the high impedance signal from the electrodes, a metering pump at the second transfer station for adding standard solution to the container at said second transfer station, signal means quantitatively responsive to the pump for measuring the amount of standard solution added to the container at the second transfer station, at any given instant, means for recording the amount of standard solution used together with the pH value of the sample, and a third transfer station for transferring each of the samples out of its sample container and cleaning the sample container.

References Cited

UNITED STATES PATENTS

| | | | |
|---|---|---|---|
| 3,178,266 | 4/1965 | Anthon | 23—253 |
| 2,624,656 | 1/1953 | Andrews et al. | 23—259 |
| 2,710,715 | 6/1955 | Gorham. | |
| 2,950,177 | 8/1960 | Brown et al. | 23—253 |
| 3,143,393 | 8/1964 | Seguin | 23—253 |
| 3,192,968 | 7/1965 | Baruch et al. | 23—259 X |
| 3,193,358 | 7/1965 | Baruch | 23—253 |
| 3,193,359 | 7/1965 | Baruch | 23—253 X |

JOSEPH SCOVRONEK, Primary Examiner

U.S. Cl. X.R.

23—259